Patented Dec. 14, 1948

2,456,099

UNITED STATES PATENT OFFICE 2,456,099

ELECTRODE FOR VACUUM DISCHARGE APPARATUS

Lester L. Winter, Lakewood, Ohio, assignor to National Carbon Company, Inc., a corporation of New York No Drawing. Application April 12, 1946, Serial No. 661,862

2 Claims. (Cl. 250—27.5)

The invention relates to improved graphite electrodes for vacuum discharge apparatus. Examples of such apparatus are rectifiers and radio tubes, but there are many other forms.

It has heretofore been recognized that the presence of excessive quantities of metal compounds is deleterious in the electrodes with which the invention is concerned, and various purifying treatments have been proposed. Some of these treatments are capable of reducing the content of impurities to a range where they might be assumed to be negligible, but I have now found that a more rigorous purification is desirable.

An object of the invention is to provide graphite electrodes for vacuum discharge devices in which the content of non-combustible matter, i. e. ash, is diminished to a point not heretofore attained in such electrodes, thereby bringing about several improvements in the operation of these devices. Some of the advantages accruing from this exceptional purity will be referred to in the following description.

In electrodes of the kind under discussion, the most objectionable impurities are compounds of the alkaline earth metals, and particularly of calcium, the predominating metal of the group. Immediately after heating to high temperatures, as in the process of manufacture, the calcium in graphite is mostly in the form of carbide, with minor quantities of sulfide and phosphide. Under ordinary storage conditions these compounds are decomposed by moisture in the air with calcium hydroxide as the non-volatile product.

In the preparation of vacuum discharge devices containing graphite electrodes the elements of the tube are subjected in situ to heat and reduced pressure before the tube is sealed. This treatment readily decomposes any calcium hydroxide present to the oxide, and brings the graphite electrode to a form in which it is apparently stable. I have discovered, however, that during continued use of the discharge device, with the attendant heating of the electrode, further chemical reactions occur with detrimental results. Thus, any calcium oxide present tends to react with the graphite to form calcium carbide and carbon monoxide. The latter impairs the vacuum in the device, and has other adverse effects. Under some conditions the calcium carbide is believed to be volatilized, or possibly dissociated and the calcium volatilized, resulting in additional interference with the functioning of the device.

Any gas evolved from the electrode, such as the carbon monoxide mentioned above, loosens graphite dust held on, or in the interstices of the graphite, and projects this dust onto the other electrodes and the envelope. The functioning of such other electrodes is thus impaired; while the envelope, if of glass, becomes unsightly and loses some of its heat-dissipating capabilities, so that it may become overheated, soften, and collapse. The presence of calcium and other impurities in graphite electrodes also appears to make rectifying devices more subject to "arc-back" or inverse current flow.

Graphite electrodes can be purified to the degree contemplated by my invention by treating them with chlorine at a sufficiently high temperature, and then washing out any residual chlorine with an inert gas, such as nitrogen, while the electrodes are still hot. A temperature of about 2300° C. may be used, but somewhat higher or lower temperatures are also effective. It is undesirable to raise the temperature to a point where graphite is volatilized from the graphite container in which the purification is ordinarily carried out, and deposited on the electrodes under treatment. The invention is not restricted to any particular method of purification, and methods other than the one cited above are available.

It has heretofore been proposed to purify graphite electrodes by heating them in chlorine, but I have found that the temperatures recommended (300° C. to 1000° C.) are inadequate to reduce the ash to such values as are contemplated by my invention.

My researches have shown that a calcium content of about 0.001% is critical in graphite electrodes for many types of vacuum discharge devices; that higher contents of calcium give rise to the undesirable effects which have been referred to herein, and that 0.001% or less of calcium does not have a significant effect. Any process adapted to eliminate calcium to the extent contemplated will, when applied to graphite of normal industrial purity, leave such small proportions of other metal compounds that their effect is negligible. Graphite electrodes as now used in vacuum discharge devices do not contain less than 0.001% of calcium nor less than 0.01% of total ash, so far as I am aware. A calcium content of 0.03% and a total ash content of 0.10% are common.

When the calcium content of graphite is reduced to about 0.001%, and the other ash constituents are diminished to a corresponding degree, the quantity of gas which the graphite is capable of evolving falls to around 15 cubic millimeters per gram or less. The evolved gas can be measured by heating the graphite slowly to 300° C. in an evacuated container to remove adsorbed moisture; then heating it rapidly to 1500° C. The gas to be measured is evolved during the latter operation, and is calculated from the volume of the container and the pressure change therein. When the quantity is less than 25 cubic millimeters per gram the graphite is satisfactory for the purposes of my invention. Grades of graphite now used in vacuum discharge devices are often capable of evolving 1000 cubic millimeters of gas per gram, and in no case less than 75 cubic millimeters so far as I am aware.

I claim:

1. In a vacuum discharge apparatus an electrode composed of graphite containing, as an impurity, calcium in a maximum proportion of 0.001%.

2. In a vacuum discharge apparatus an electrode composed of graphite containing, as an impurity, calcium in a maximum proportion of 0.001%, said electrode evolving during use a maximum of 25 cubic millimeters of gas per gram.

LESTER L. WINTER.

REFERENCES CITED

The following references are of record in the file of this patent:

UNITED STATES PATENTS

| Number | Name | Date |
|---|---|---|
| 2,117,497 | Owens | May 17, 1938 |
| 2,360,707 | Mouromtseff et al. | Oct. 17, 1944 |